US012227002B2

(12) United States Patent
Vuckovic et al.

(10) Patent No.: US 12,227,002 B2
(45) Date of Patent: Feb. 18, 2025

(54) ELECTRONIC TAG MOUNTS FOR PRINTER MEDIA SUPPLY ROLLS

(71) Applicant: ZEBRA TECHNOLOGIES CORPORATION, Lincolnshire, IL (US)

(72) Inventors: Miroslav Vuckovic, Skokie, IL (US); Annika Matas Alonzo, Northridge, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 199 days.

(21) Appl. No.: 17/894,807

(22) Filed: Aug. 24, 2022

(65) Prior Publication Data

US 2024/0066897 A1 Feb. 29, 2024

(51) Int. Cl.
*B41J 15/04* (2006.01)

(52) U.S. Cl.
CPC .................................. *B41J 15/044* (2013.01)

(58) Field of Classification Search
CPC .............................. B41J 15/044; B41J 15/042
See application file for complete search history.

(56) References Cited

U.S. PATENT DOCUMENTS

2013/0216292 A1 8/2013 Yokoyama
2017/0080724 A1* 3/2017 Mori ........................ B41J 2/325

FOREIGN PATENT DOCUMENTS

JP 2007261769 A * 10/2007
JP 20070261769 A 10/2007
JP 2008143139 A * 6/2008

OTHER PUBLICATIONS

International Search Report and Written Opinion for International Application No. PCT/US2023/28224 mailed on Oct. 27, 2023.

* cited by examiner

*Primary Examiner* — Justin Seo
*Assistant Examiner* — Tracey M McMillion

(57) ABSTRACT

A tag mount for a media supply roll having a hollow cylindrical core includes: a tag mount body including: (i) an inner wall configured to face the core, the inner wall having a retaining surface to engage with the core and affix the tag mount body to the core, (ii) an outer wall opposite the inner wall, and (iii) a carrier surface, distinct from the retaining surface, the carrier surface defined on one of the inner wall and the outer wall; an antenna affixed to the carrier surface; and an integrated circuit coupled with the antenna and configured to store an attribute corresponding to the media supply roll.

20 Claims, 12 Drawing Sheets

ELECTRONIC TAG MOUNTS FOR PRINTER MEDIA SUPPLY ROLLS

BACKGROUND

Media supplies for printers can include rolls of labels, receipt paper, or the like. A given printer may accommodate multiple distinct media supplies at different times, e.g., different label widths, and the like. Configuring the printer for each media supply may require time-consuming manual setup by an operator of the printer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
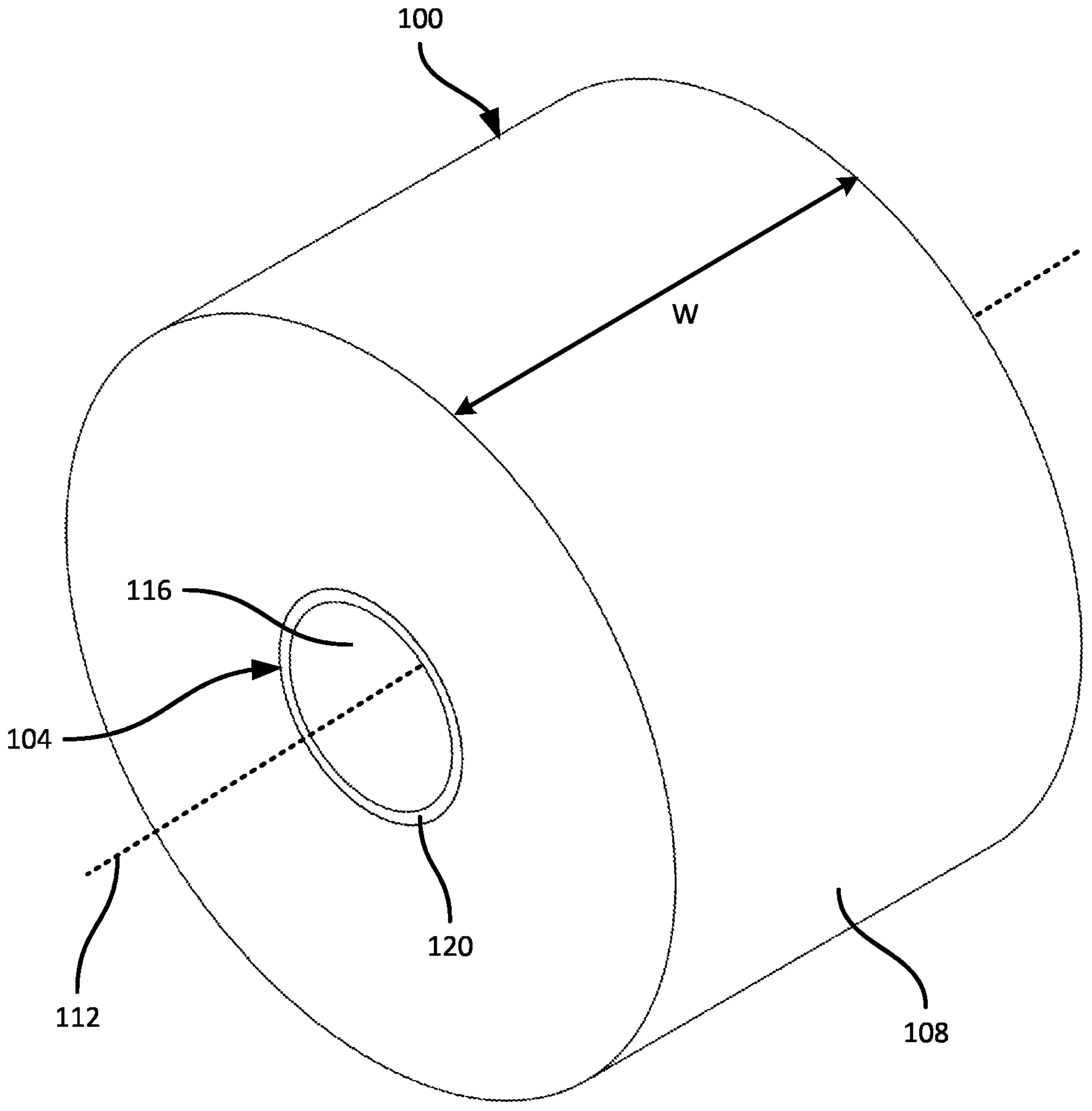
FIG. 1 is an isometric view of a media supply roll.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a tag mount for a media supply roll having a hollow cylindrical core, the tag mount including: a tag mount body including: (i) an inner wall configured to face the core, the inner wall having a retaining element to engage with the core and affix the tag mount body to the core, (ii) an outer wall opposite the inner wall, and (iii) a carrier surface, distinct from the retaining surface, the carrier surface defined on one of the inner wall and the outer wall; an antenna affixed to the carrier surface; and an integrated circuit coupled with the antenna and configured to store an attribute corresponding to the media supply roll.

Additional examples disclosed herein are directed to a system, comprising: a media supply including a core supporting a web of print media; and a tag mount body including: (i) an inner wall configured to face the core, the inner wall having a retaining element to engage with the core and affix the tag mount body to the core, (ii) an outer wall opposite the inner wall, and (iii) a carrier surface, distinct from the retaining surface, the carrier surface defined on one of the inner wall and the outer wall; an antenna affixed to the carrier surface; and an integrated circuit coupled with the antenna and configured to store an attribute corresponding to the media supply roll.

FIG. 1 illustrates a media supply 100 for a printer, such as a table-top printer (e.g., used to print labels, receipts, or the like). The media supply 100 includes a hollow cylindrical core 104, on which is wound a web 108 of paper, labels mounted on a paper or polymer backing, or the like. The media supply 100 can be installed in a printer, e.g., by mounting the core 104 on opposing spindles in the printer, such that the core is supported to allow rotation of the media supply 100 about an axis 112. The web 108 can be unspooled by rotation of the media supply 100, e.g., driven by a nip formed in the printer by a platen roller and a print head (e.g., a thermal print head, such as an array of individually controllable thermal elements or dots).

The core 104 can be a tube of cardboard, paperboard, or the like. Various other materials can also be used to manufacture the core 104. In general, the core 104 includes an inner surface 116 defining a cylindrical channel through the core 104. The inner surface 116, and therefore the channel, are substantially parallel to the axis 112. The core 104 also includes a pair of opposing end surfaces, of which one end surface 120 is visible in FIG. 1. The core 104 further includes an outer surface, on which the web 108 is mounted. As the web 108 is present in FIG. 1, the outer surface is not visible.

The properties of the web 108 can vary across different media supplies, and some printers are compatible with media supplies having webs 108 with differing properties. For example, some printers can accommodate a media supply with a printable width "W" of two inches, four inches, or six inches (a wide variety of other printable widths are also contemplated). Further, some printers can accommodate a media supply 100 carrying thermally-sensitive media that is compatible with direct thermal printing, as well as a media supply 100 carrying media compatible with thermal transfer printing, in which a ribbon cartridge in the printer supplies ribbon to the above-mentioned nip along with the media from the media supply 100, to transfer pigment from the ribbon to the media.

A further property that varies between media supplies 100 is a length or total quantity (e.g., expressed as a number of labels on the web 108). In some cases, media supplies 100 can also be continuous (e.g., a web 108 consisting of continuous media such as receipt paper), or non-continuous (e.g., a web 108 consisting of discrete labels separated by gaps or marks). In further cases, media supplies 100 can impose distinct sensing requirements on the printer. For example, the printer can include one or more optical sensors in the media path between the media supply 100 and the above-mentioned nip. The optical sensors can be operated in one configuration when the web 108 includes discrete labels or other sections divided by gaps (e.g., translucent portions of a polymer web where paper or other material has been removed), and in a different configuration when the web 108 includes discrete labels or other sections divided by colored marks (e.g., black bars separating labels).

To make use of the media supply 100, therefore, a configuration of the printer may require adjustment. Such adjustments may involve manual adjustment, e.g., by an operator of the printer. To alleviate the need to make manual adjustments, while also avoiding or reducing the need to modify manufacturing processes for media supplies 100, described below are tag mount devices that can be affixed to the media supply 100, and that carry an integrated circuit and a wireless antenna, e.g., in the form of a radio frequency identification (RFID) tag. Once affixed to the media supply 100, the tag supported on the tag mount can be read, e.g., by an RFID reader in the printer, to extract properties of the media supply 100. Such extraction then enables the printer to automatically update relevant configuration settings to make use of the media supply 100.

Figure 2:
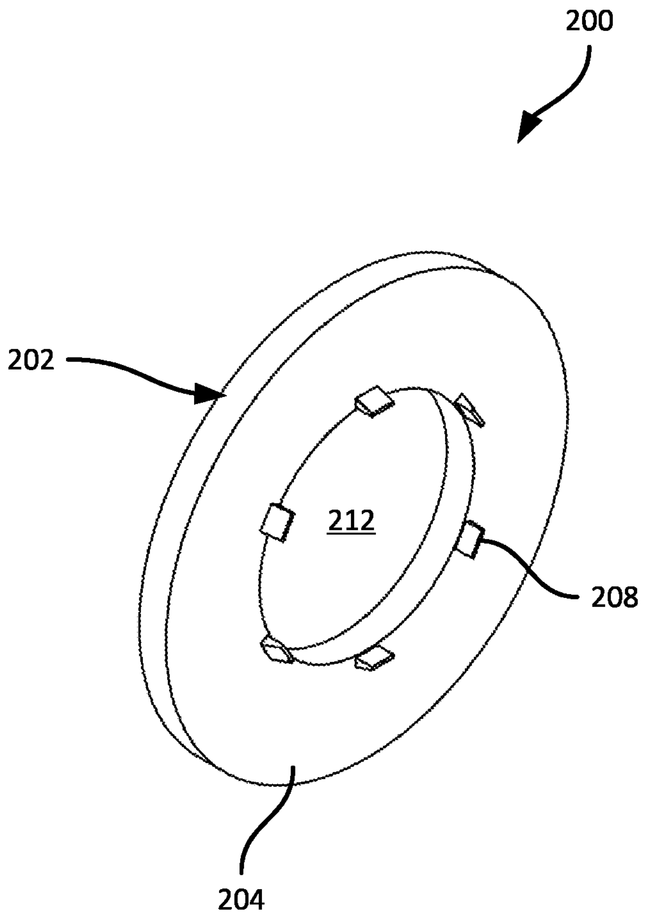
FIG. 2 is an isometric view of an inner side of a tag mount.

Turning to FIG. 2, an example tag mount 200 is shown in isolation. The tag mount 200 includes a body 202 having an inner wall 204, and an opposite outer wall (not visible in FIG. 2). The inner wall 204 is referred to as "inner" because it is configured to face towards the core 104 when the tag mount 200 is assembled to the media supply 100. The inner wall 204 includes a retaining surface to engage with the core 104, and affix the tag mount body 202 to the core 104. In this example, the inner wall 204 includes a plurality of tabs 208 extending inwards, such that the tabs 208 are substantially parallel to the axis 112 when the tag mount 200 is assembled to the media supply 100. The tabs 208, and any retaining surface or set of retaining surfaces more generally, can also be referred to as retaining elements. The inner wall 204 includes six tabs 208 in this example, but in other examples the inner wall 204 can include a smaller or greater number of tabs 208. The tabs 208 are wedge-shaped in this example, but can have also various other configurations. The body 202 is annular in the illustrated example, and includes an opening 212 therethrough, configured to align with the channel of the core 104 mentioned in connection with FIG. 1. The tabs 208 are disposed adjacent to the opening 212, to align the tabs 208 with the end 120 of the core 104.

Figure 3:
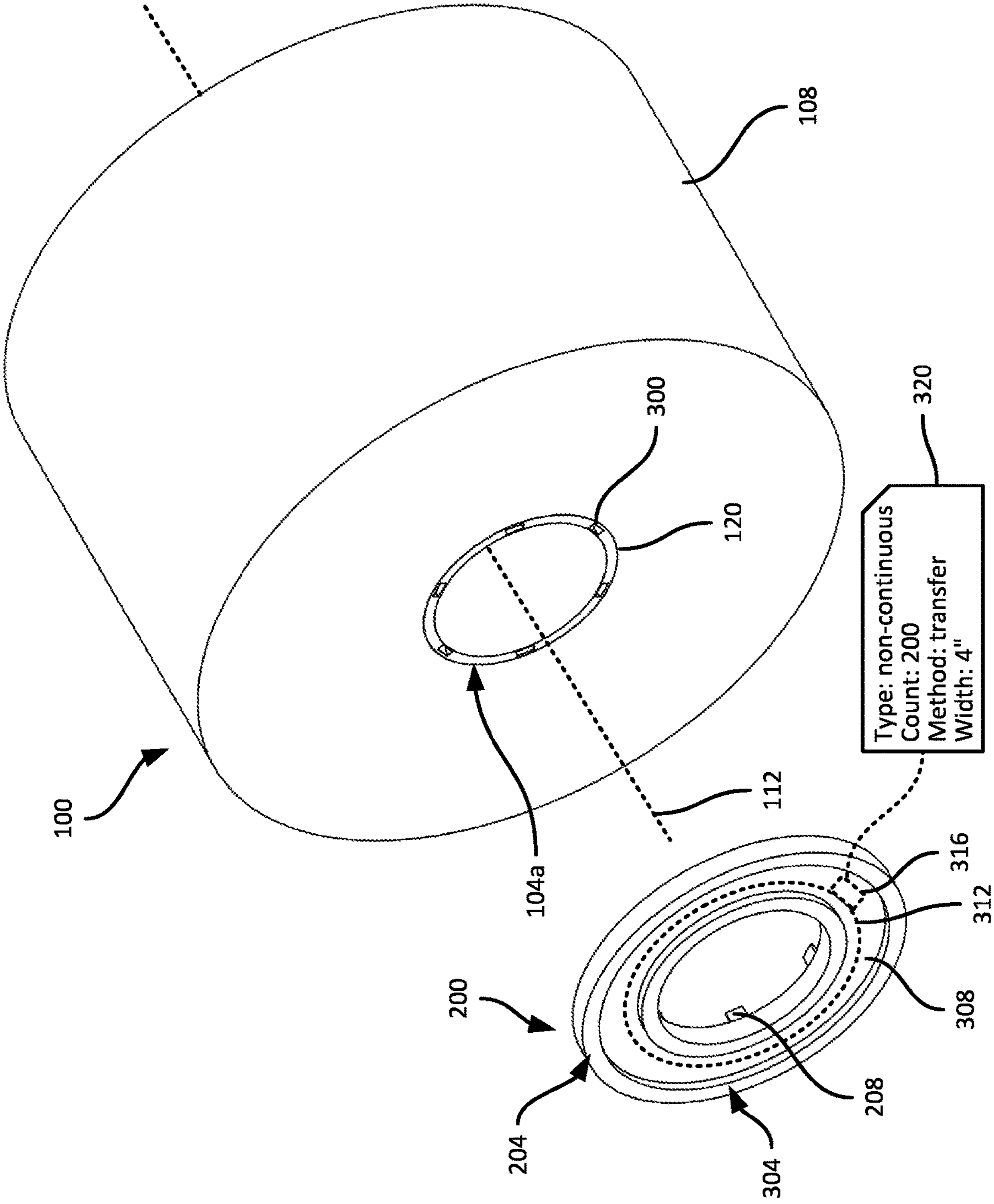
FIG. 3 is an exploded isometric view of the tag mount of FIG. 2 and a media supply roll.

The tabs 208 form the retaining surface mentioned above. That is, the surfaces of each tab 208 are configured to engage with the core 104 of the media supply 100 to affix the body 202 to the core 104. In particular, as shown in FIG. 3, a modified core 104*a* can be provided prior to installation of the tag mount 200, e.g., by pressing a plurality of slots 300 into the end 120 of the core 104. Installing the tag mount 200 includes pressing the tag mount into the core 104, such that the tabs 208 press-fit into the slots 300. The number and arrangement of slots 300 pressed into the end 120 of the core therefore is equal to the number and arrangement of tabs 208 on the inner surface 204.

The retaining surfaces defined by the tabs 208 therefore affixes the tag body 202 to the core 104, and the media supply 100 can then be installed into a printer for use. As will be apparent, the core 104 can be manufactured with the slots 300 therein, e.g., prior to application of the web 108, but such a modification to the manufacturing process is not necessary. In other examples, the slots 300 can be pressed into the core 104 after the web 108 is applied, e.g., by an entity other than the manufacturer(s) of the media supply 100. For example, depending on the hardness of the material used in the core 104, the tabs 208 themselves may be used to form the slots 300 during assembly of the tag mount 200 to the core 104. In other examples, the media supply 100 can be pressed onto a die configured to press the slots 300 into the core, prior to installation of the tag mount 200.

FIG. 3 also illustrates an outer wall 304 of the tag mount body 202. As seen in FIG. 3, the outer wall 304 is a continuous surface, or a set of contiguous surfaces facing away from the core 104. The tag mount 200 also includes a carrier surface 308, which in the illustrated example is on the outer wall 304. The carrier surface 308, in this example, is recessed relative to the other surfaces of the outer wall 304, but in other examples the carrier surface 308 can be a region of a single planar surface (e.g., not recessed relative to other surfaces of the outer wall 304). As seen in FIG. 3, the inner wall 204 and the outer wall 304 are substantially perpendicular to the axis 112 of the core 104, when the tag mount 200 is assembled to the core 104.

The carrier surface is distinct from the retaining surface (provided by the tabs 208 in this example), but can be on either the inner wall 204 or the outer wall 304 in other examples. The carrier surface 308 is configured to carry a wireless antenna 312, such as the antenna of an RFID tag (illustrated in dashed lines to distinguish visually from the edges of the tag mount body 202). The carrier surface 308 also carries, in this example, an integrated circuit 316 coupled to the antenna 312 and configured to store one or more attributes of the media supply 100. Example attributes 320 are shown in FIG. 3, including a type of the media (e.g., continuous vs. non-continuous), a count of discrete media sections such as labels, a print method (e.g., direct thermal vs. thermal transfer), and a printable width of the media. The attributes 320 can also include a unique identifier of the circuit 316 itself, for example. The antenna 312 is illustrated as an annular antenna in this example, but it will be understood that a wide variety of other antenna structures can also be employed.

As will be apparent, the antenna 312 and the circuit 316 are configured, in response to an interrogation signal from an RFID reader (e.g., deployed inside a printer), to return some or all of the data stored at the circuit 316 (e.g., the attributes 320). The printer can therefore automatically obtain media attributes, and select configuration settings (e.g., previously stored at the printer) corresponding to those media attributes. In some examples, the printer can also write data back to the circuit 316. For example, upon completing a print job, the printer can write an updated "count" value (e.g., 199 in the illustrated example) to the circuit 316, such that future retrievals of the attributes 320 by the printer or another printer provide an accurate count of available media on the supply 100.

Figure 4:
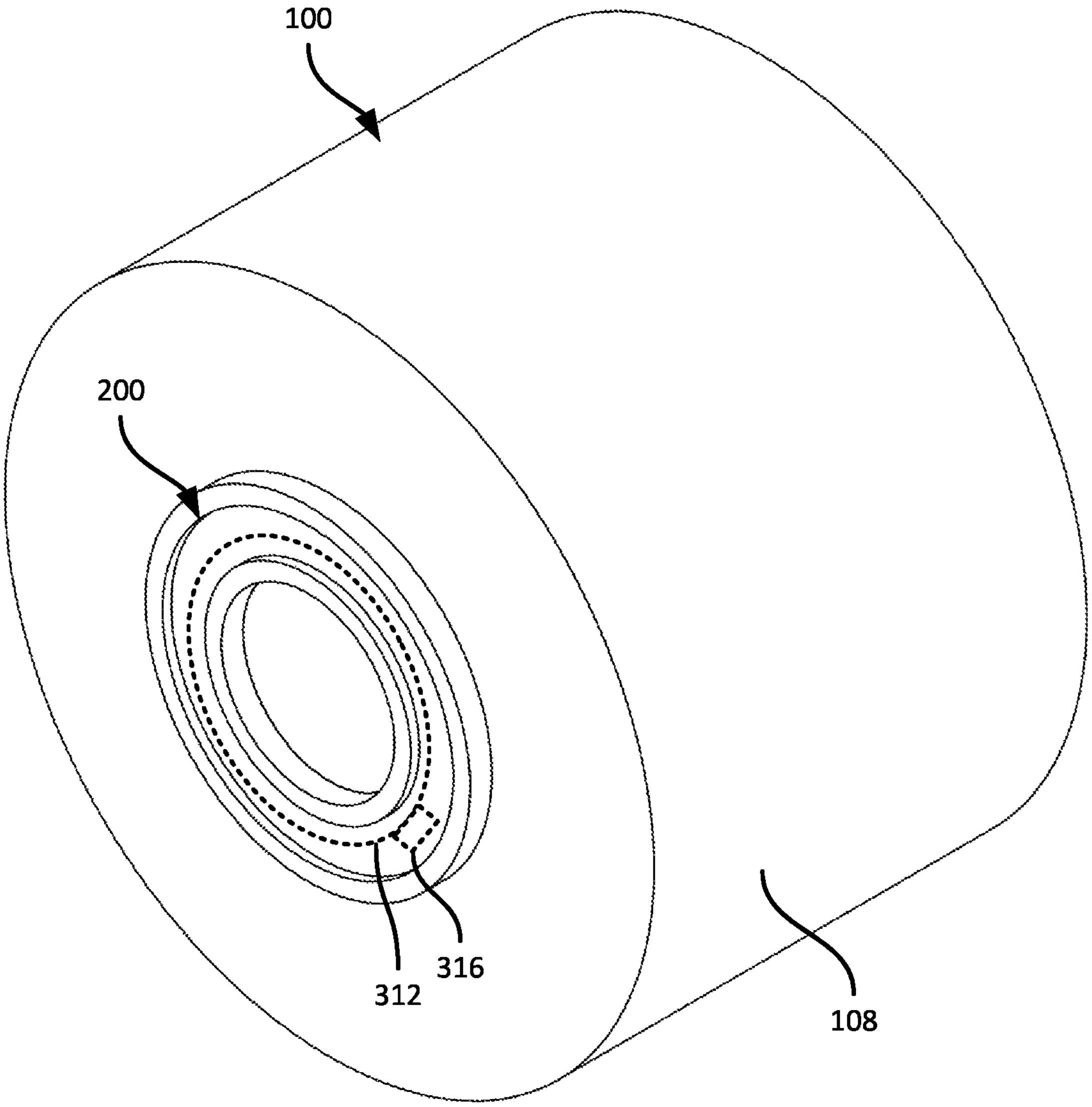
FIG. 4 is an assembled view of the tag mount of FIG. 2 and a media supply roll.

FIG. 4 illustrates the tag mount 200 affixed to the media supply 100. In particular, the tabs 208 are inserted into the slots 300, such that the remainder of the inner wall 204 is flush against the end 120 of the core 104 and the web 108. The antenna 312 and the circuit 316 face outwards from the core 104, to facilitate read and/or write access to an RFID reader or other suitable wireless communications assembly within the printer. In other examples, the antenna 312 and/or the circuit 316 can be embedded within the tag mount body 202.

Figure 5:
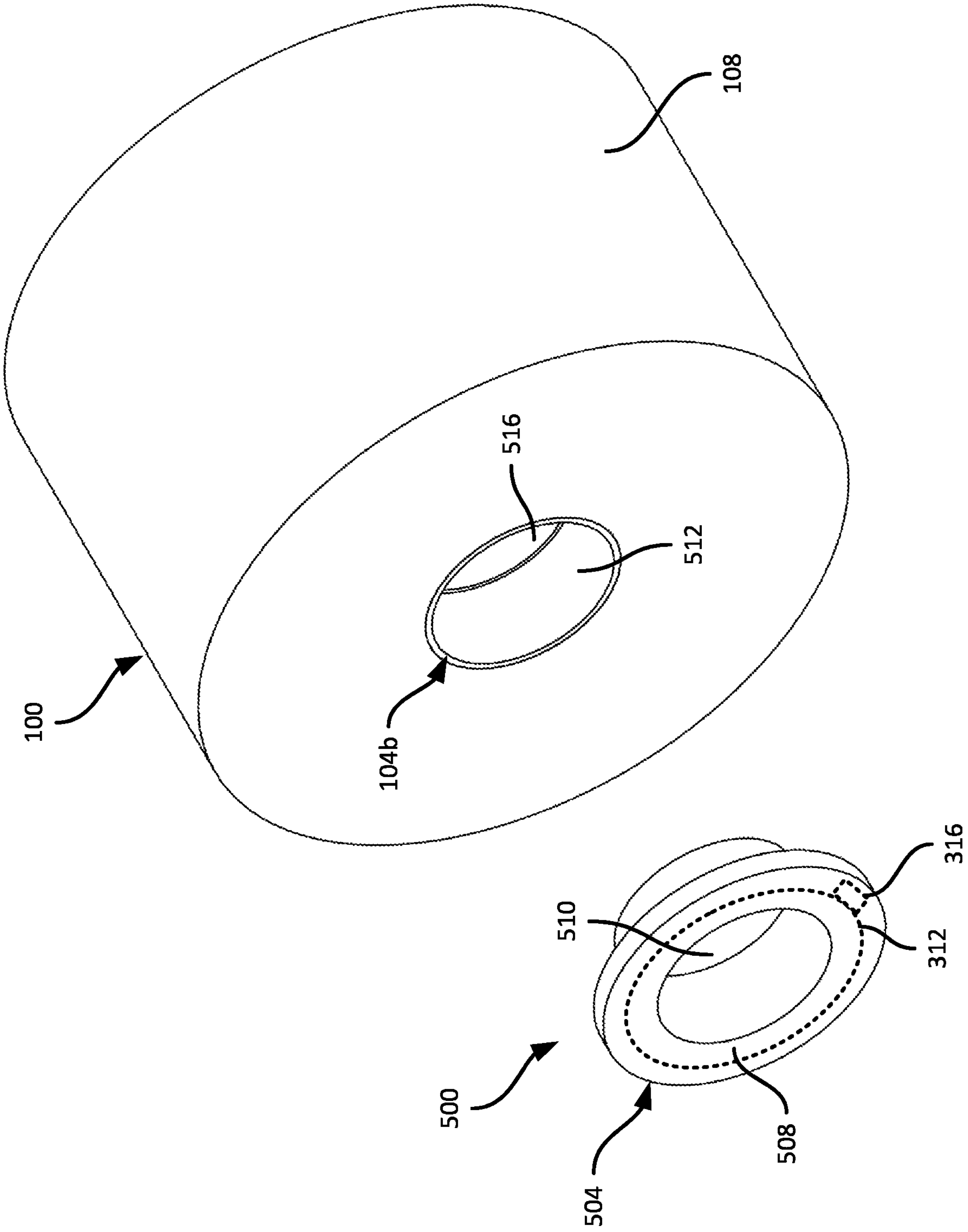
FIG. 5 is an exploded isometric view of another tag mount and a media supply roll.

FIG. 5 illustrates another example tag mount 500, including a body 504 with an outer wall 508 including a carrier surface for carrying the antenna 312. As seen in FIG. 5, the outer wall 508 has a single continuous, planar surface, and the carrier surface is a portion of that planar surface, rather than being recessed as in the embodiment of FIGS. 2-4. The body 504 is annular, with an opening 510 therethrough configured to align with the channel of a modified core 104*b*. The core 104*b*, in particular, can include an outer portion

512 and an inner portion 516 with different inner diameters, as will be discussed below in greater detail.

Figure 6:
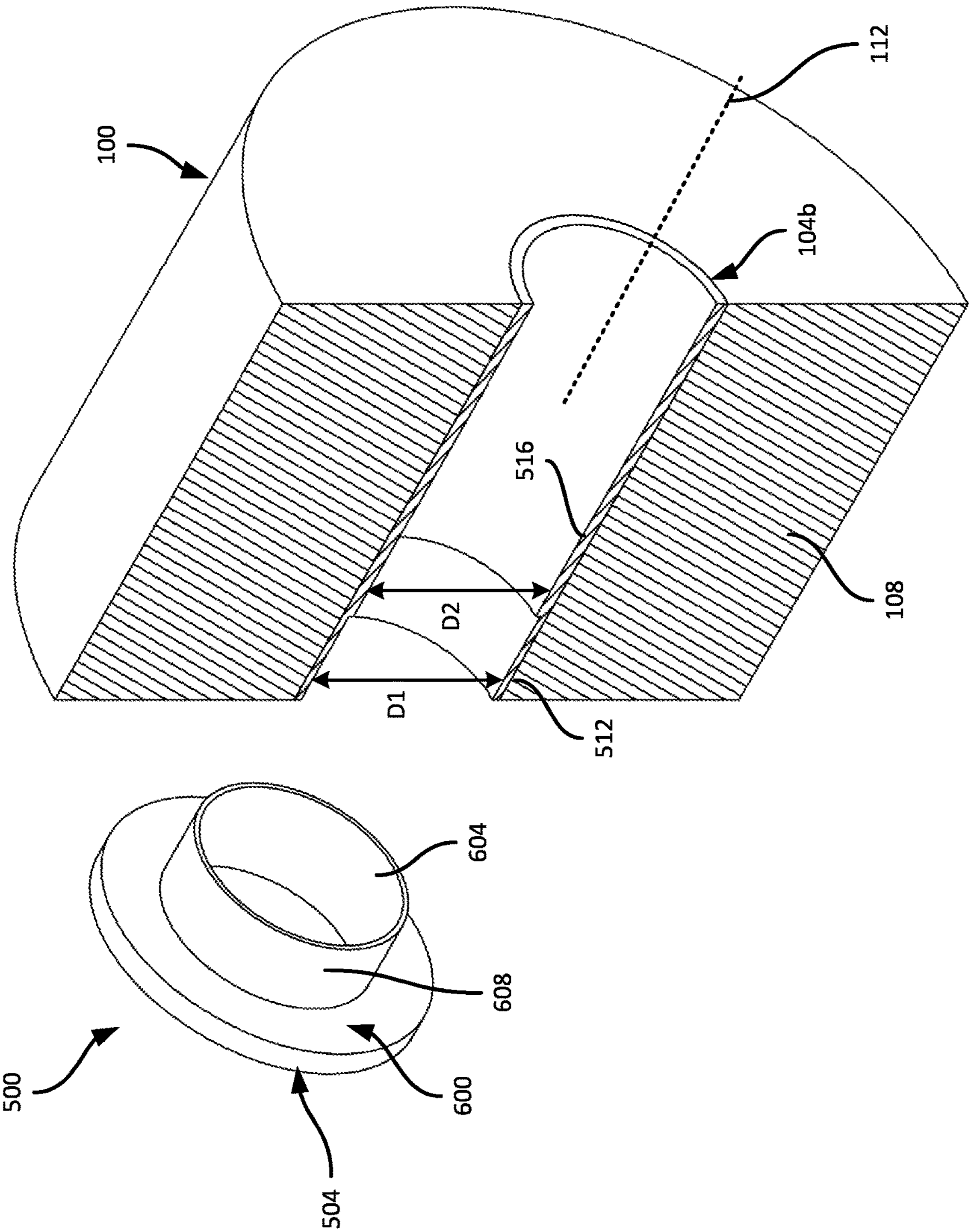
FIG. 6 is a cross section of an exploded isometric view of the tag mount a media supply roll of FIG. 5.

Turning to FIG. 6, the media supply 100 is shown in cross section, revealing that the portion 512 of the core **104*b* has a greater inner diameter "D1" than the diameter "D2" of the portion 516. For example, material can be removed from the core 104*b* in the portion 512 to enlarge the inner diameter of the portion 512. The tag mount 500 includes an inner wall 600, which in turn includes a sleeve 604 extending therefrom substantially parallel to the axis 112 of the core 104*b*. The outer surface 608 of the sleeve is the retaining surface of the tag mount 500. In particular, the outer diameter of the sleeve 604 (i.e., measured to the retaining surface 608) is substantially equal to D1. Thus, pressing the tag mount 500 into the core 104*b* press-fits the sleeve 604 into the portion 512 of the core 104*b***.

Figure 7:
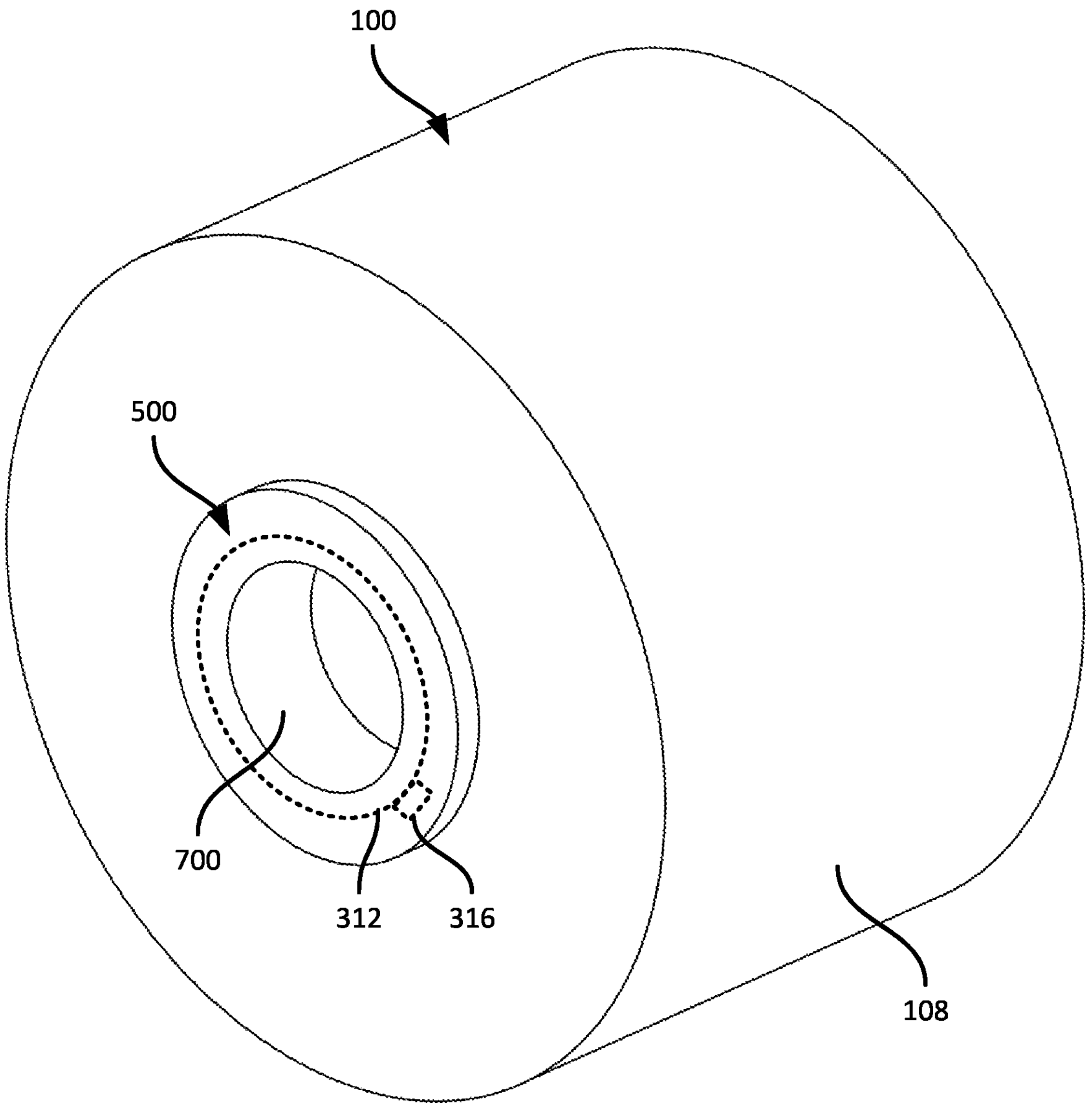
FIG. 7 is an assembled view of the tag mount and media supply roll of FIG. 5.

FIG. 7 illustrates the tag mount 500 following assembly to the core **104*b*. In particular, the sleeve 604 is received entirely within the channel defined by the core 104*b*, and the remainder of the inner wall 600 is flush against the end of the core 104*b* and the web 108. The antenna 312 and the circuit 316 face outwards from the core 104, to facilitate read and/or write access to an RFID reader as mentioned above. In other examples, the antenna 312 can be placed elsewhere, such as on an inner surface 700 of the sleeve 604 (i.e. the carrier surface can be on the sleeve 604 of the inner wall 600, rather than on the outer wall 508**).

Figure 8:
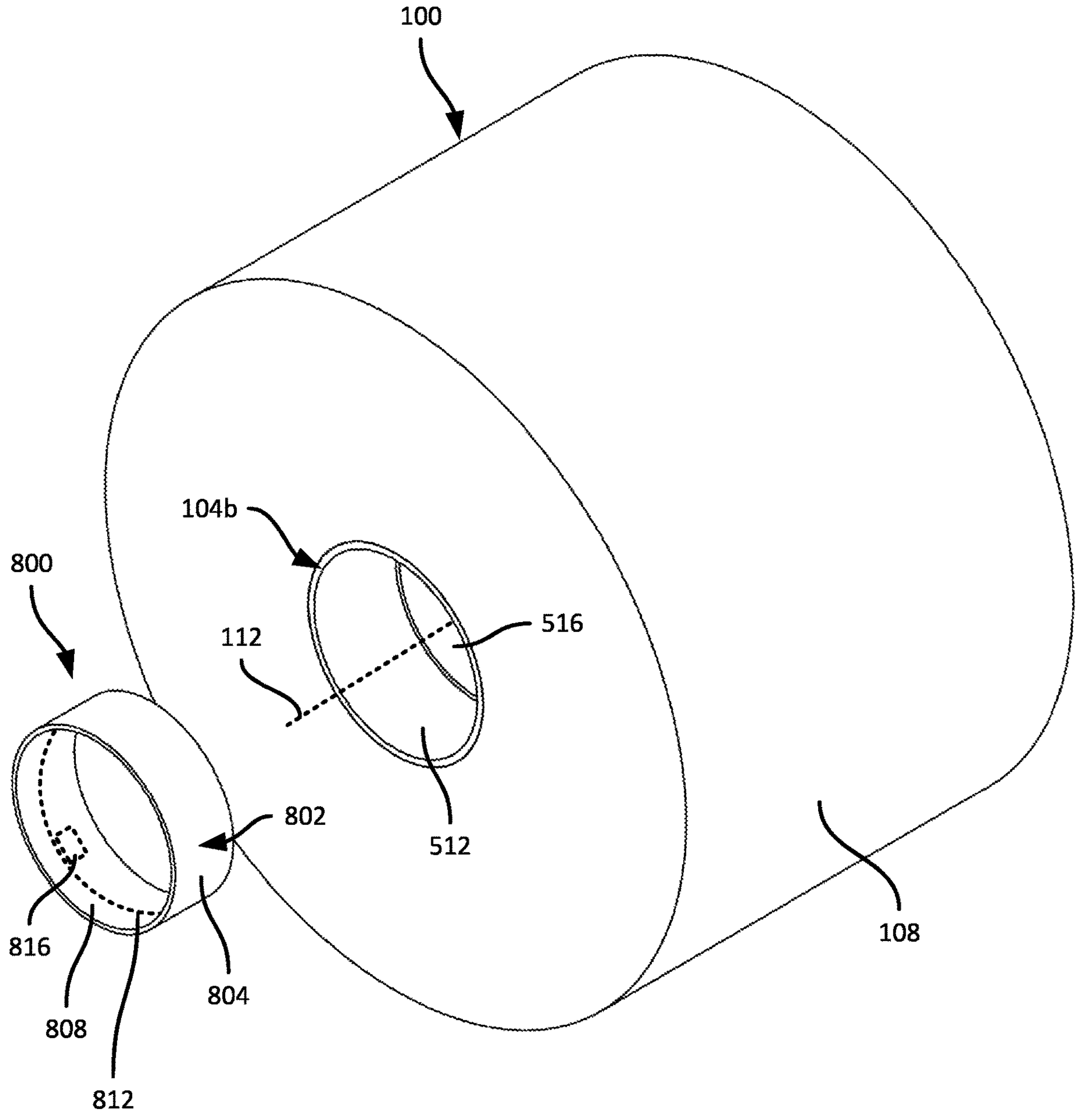
FIG. 8 is an exploded isometric view of a further tag mount and a media supply roll.

FIG. 8 illustrates a further example tag mount 800 having a cylindrical body 802, in which an inner wall 804 and an outer wall 808 are substantially parallel to the axis 112. The entirety of the inner wall 804, in this example, is the retaining surface, as the body 802 is configured to be inserted into the portion 512 of the core **104*b*, e.g., to press-fit the inner wall 804 against the interior of the core 104*b*. The carrier surface is a region of the outer wall 808, and carries an antenna 812 and integrated circuit 816. As noted earlier, the antenna 812** need not be annular in other examples.

Figure 9:
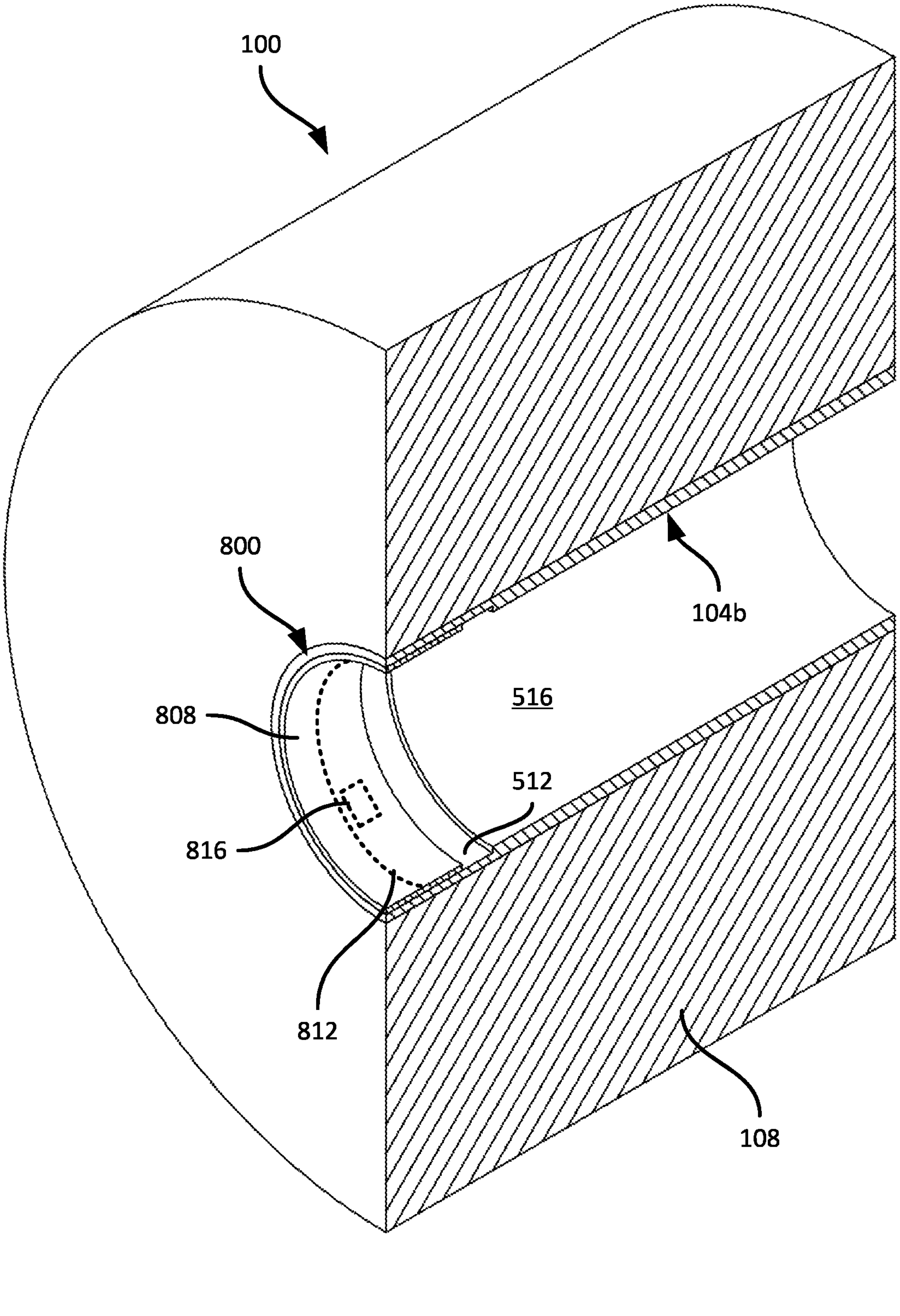
FIG. 9 is a cross section of an exploded isometric view of the tag mount a media supply roll of FIG. 8.
Figure 10:
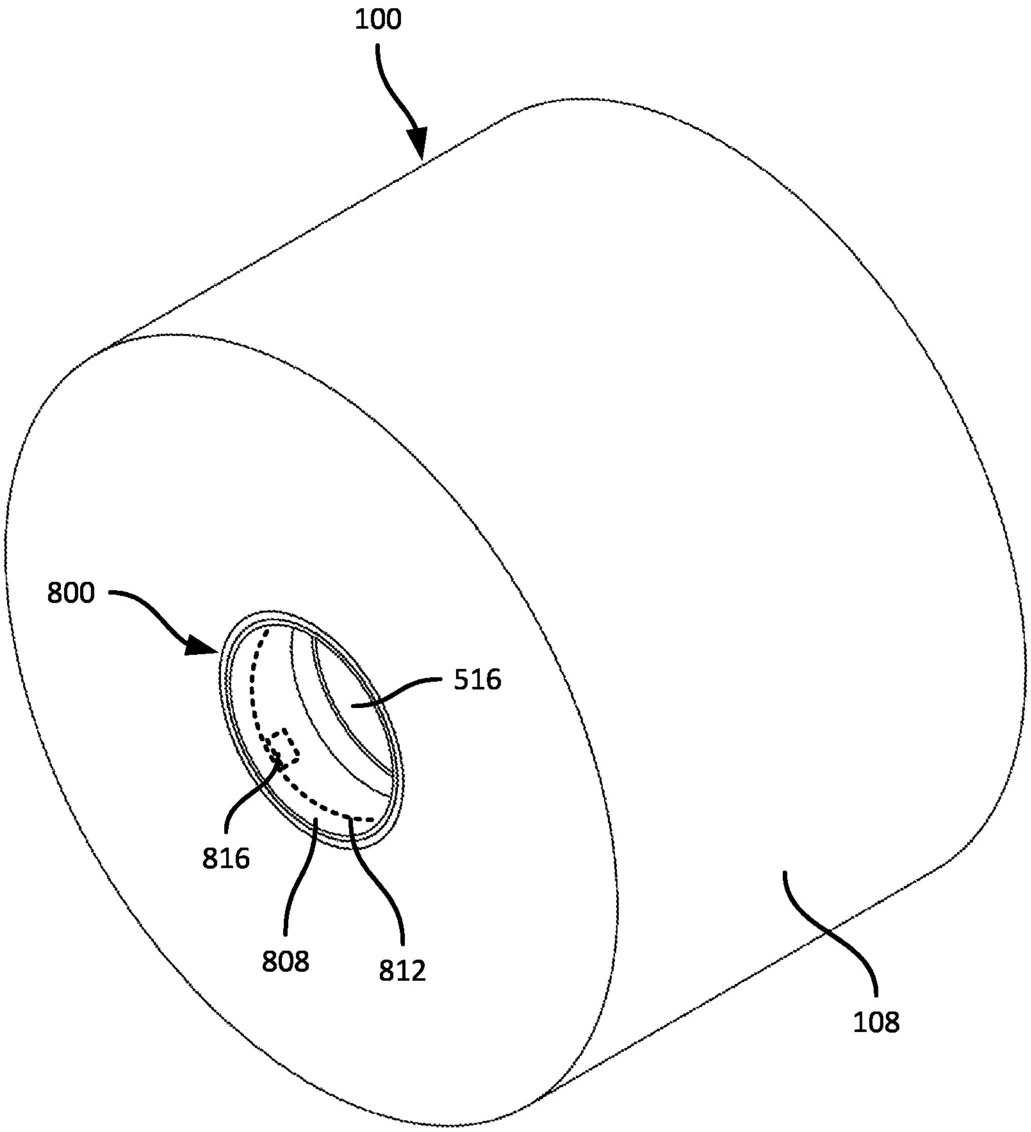
FIG. 10 is an assembled view of the tag mount and media supply roll of FIG. 8.

FIG. 9 illustrates a cross-sectional view of the tag mount 800 installed in the core **104*b*. As shown in FIG. 9, the tag mount 800 fits entirely within the channel defined by the core 104*b* in this example. In other examples, however, a portion of the tag mount 800 can protrude from the channel when installed. FIG. 10 illustrates an assembled view of the tag mount 800 and the media supply 100**.

Figure 11:
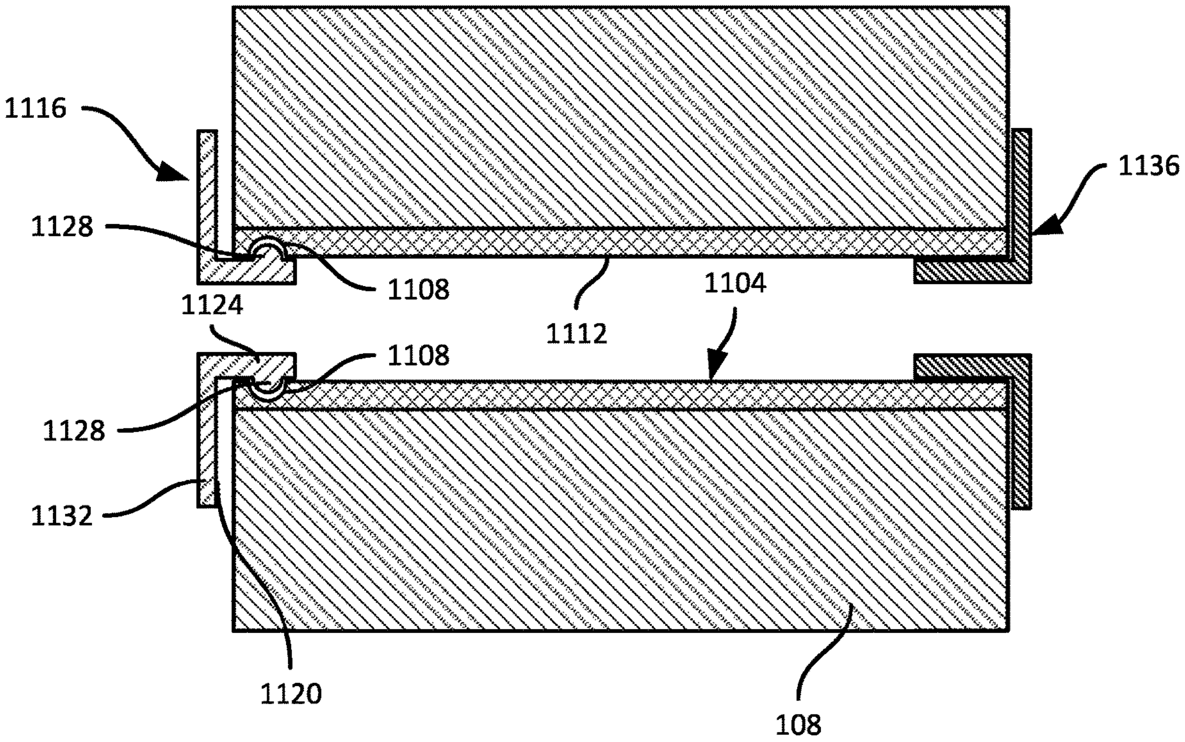
FIG. 11 is a cross section of another example tag mount.

FIG. 11 illustrates a cross-sectional view of a further example tag mount. As shown in FIG. 11, a core 1104 can include an indentation, e.g., an annular channel 1108, cut into an inner surface 1112 thereof (e.g., extending continuously around the inner surface 1112), adjacent to one end of the core 1104. A tag mount 1116 can include an inner wall 1120 from which a sleeve 1124 extends, including a retaining element in the form of a ridge 1128 with a complementary shape to that of the channel 1108. The ridge 1128 configures the tag mount 1116 to be snap-fitted into the core 1104. In other examples, the sleeve 1124 can include a channel and the inner surface 1112 of the core 1104 can include the ridge. An antenna and chip can be supported on an outer wall 1132 of the tag mount 1116, or on the inner wall 1120.

As also shown in FIG. 11, an auxiliary cap 1136 can be included with the tag mount 1116, e.g., in a kit with the tag mount 1116. The cap 1136 need not include an antenna or chip, but can be press-fit, snap-fit, or otherwise affixed to the core 1104 at the end opposite the tag mount 1116, to provide a consistent cosmetic appearance at both ends of the core 1104. A cap 1136 can also be included with any other example tag mount described herein.

Figure 12:
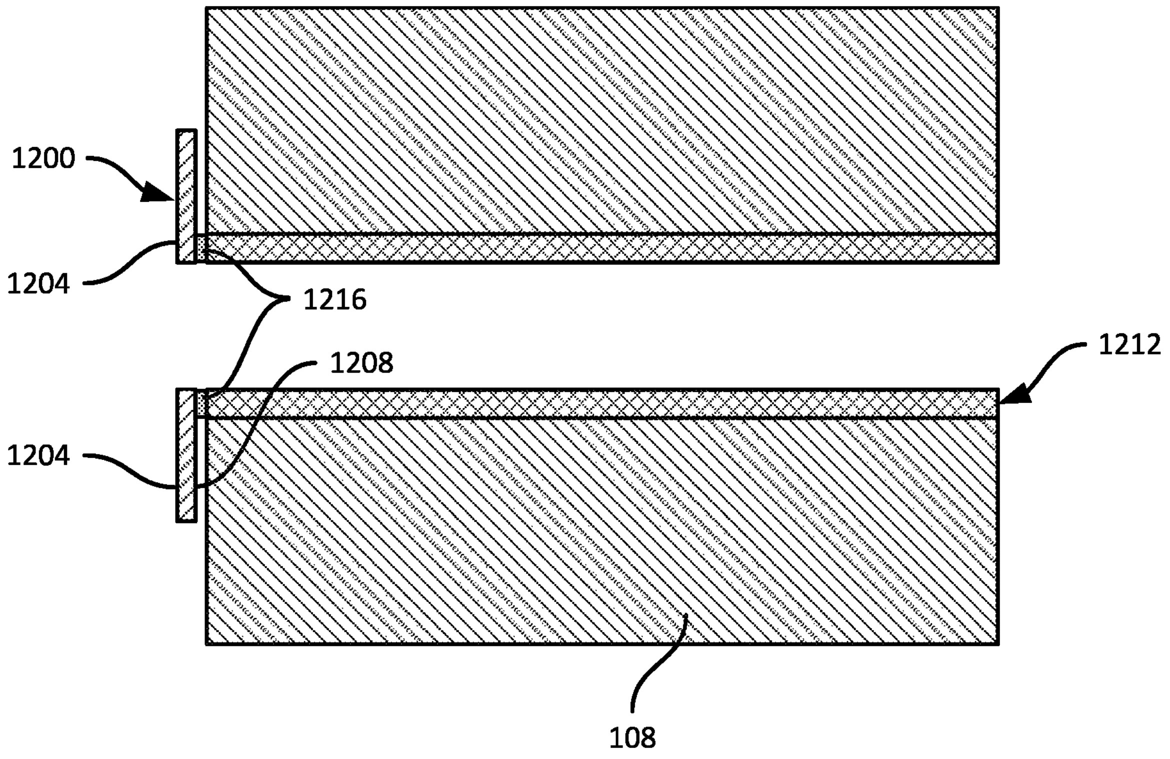
FIG. 12 is a cross section of a further example tag mount.

FIG. 12 illustrates a further tag mount 1200 in cross section. The tag mount 1200 includes an outer wall 1204 and an inner wall 1208. The retaining element of the tag mount 1200 is a portion of the surface of the inner wall 1208, which can be affixed to a core 1212 by an adhesive 1216, e.g., a continuous ring of adhesive surrounding the hollow channel extending through the core 1212. In some examples, the inner wall 1208 can include a sleeve extending therefrom and carrying the adhesive on a retaining surface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A tag mount for a media supply roll having a hollow cylindrical core, the tag mount comprising:
- a tag mount body including:
  - (i) an inner wall configured to face the core, the inner wall having a retaining element to engage with the core and affix the tag mount body to the core,
  - (ii) an outer wall opposite the inner wall, and
  - (iii) a carrier surface, distinct from the retaining element, the carrier surface defined on one of the inner wall and the outer wall;
- an antenna affixed to the carrier surface; and
- an integrated circuit coupled with the antenna and configured to store an attribute corresponding to the media supply roll.

2. The tag mount of claim 1, wherein the antenna and the integrated circuit form a radio frequency identification (RFID) tag.

3. The tag mount of claim 2, wherein the RFID tag is configured, in response to interrogation by an RFID reader of a printer in which the media supply roll is installed, to transmit the attribute corresponding to the media supply roll.

4. The tag mount of claim 3, wherein the RFID tag is configured to:
- store a supply count;
- receive an updated supply count from the printer; and
- update the stored supply count.

5. The tag mount of claim 1, wherein the attribute includes at least one of:
- a type of media on the media supply roll;
- a print method compatible with the media; and
- a print width of the media.

6. The tag mount of claim 1, wherein the inner wall and the outer wall are substantially perpendicular to an axis of rotation of the core.

7. The tag mount of claim 6, wherein the retaining element includes a plurality of tabs extending from the inner wall substantially parallel to the axis of rotation, the tabs configured for insertion into respective slots defined in an end of the core.

8. The tag mount of claim 7, wherein the body is annular, and includes an opening therethrough configured to align with a channel extending through the core; and
- wherein the carrier surface is an annular surface on the outer wall.

9. The tag mount of claim 6, wherein the inner wall includes a sleeve extending substantially parallel to the axis of rotation, the sleeve defining the retaining element and configured for insertion into a channel extending through the core.

10. The tag mount of claim 6, wherein the carrier surface is defined on the outer wall.

11. The tag mount of claim 1, wherein the inner wall and the outer wall are substantially parallel to an axis of rotation of the core.

12. The tag mount of claim 11, wherein the body is cylindrical, and configured for insertion into a hollow channel extending through the core; and
- wherein the retaining element of the inner wall is configured to engage with a surface of a channel extending through the core.

13. The tag mount of claim 1, wherein the retaining element includes a ridge configured to engage with a corresponding channel of the core to snap the tag mount onto the core.

14. A system, comprising:
- a media supply including a core supporting a web of print media; and
- a tag mount body including:
  - (i) an inner wall configured to face the core, the inner wall having a retaining element to engage with the core and affix the tag mount body to the core,
  - (ii) an outer wall opposite the inner wall, and
  - (iii) a carrier surface, distinct from the retaining element, the carrier surface defined on one of the inner wall and the outer wall;
- an antenna affixed to the carrier surface; and
- an integrated circuit coupled with the antenna and configured to store an attribute corresponding to the media supply roll.

15. The system of claim 14, wherein the inner wall and the outer wall are substantially perpendicular to an axis of rotation of the core.

16. The system of claim 15, wherein the retaining element includes a plurality of tabs extending from the inner wall substantially parallel to the axis of rotation, the tabs configured for insertion into respective slots defined in an end of the core.

17. The system of claim 16, wherein the core includes a plurality of slots pressed into an end of the core, for receiving the tabs.

18. The system of claim 14, wherein the inner wall includes a sleeve extending substantially parallel to the axis of rotation, the sleeve defining the retaining element and configured for insertion into a channel extending through the core.

19. The system of claim 18, wherein the channel includes a first portion for receiving the sleeve, and a second portion; and wherein an inner diameter of the first portion is larger than an inner diameter of the second portion.

20. The system of claim 14, wherein the core includes a channel, and wherein the retaining element includes a ridge configured to engage with the channel to snap the tag mount onto the core.

* * * * *